MULTIPLE VARACTOR FREQUENCY DOUBLER

Filed April 15, 1965

Joseph Habra,
INVENTOR.
BY.
Gerald Singer
AGENT.

3,434,037

MULTIPLE VARACTOR FREQUENCY DOUBLER

Joseph H. Habra, Lawndale, Calif., may be granted to National Aeronautics and Space Administration under provisions of 42 U.S.C. 2457(d)

Filed Apr. 15, 1965, Ser. No. 448,365
U.S. Cl. 321—69 1 Claim
Int. Cl. H02m 5/16; H01p 7/00

ABSTRACT OF THE DISCLOSURE

A frequency multiplier comprising a dual cavity device in which the input cavity resonates at a frequency of $\omega_1$ and an output cavity arranged to resonate at a frequency of $2\omega_1$. A pair of varactor elements external to the input cavity is coupled to said input cavity for generating current of the desired output frequency. The output cavity includes the dual varactors as part of the tuned circuit for generating the desired multiplied frequency.

Figures 1, 2, 3, 4:
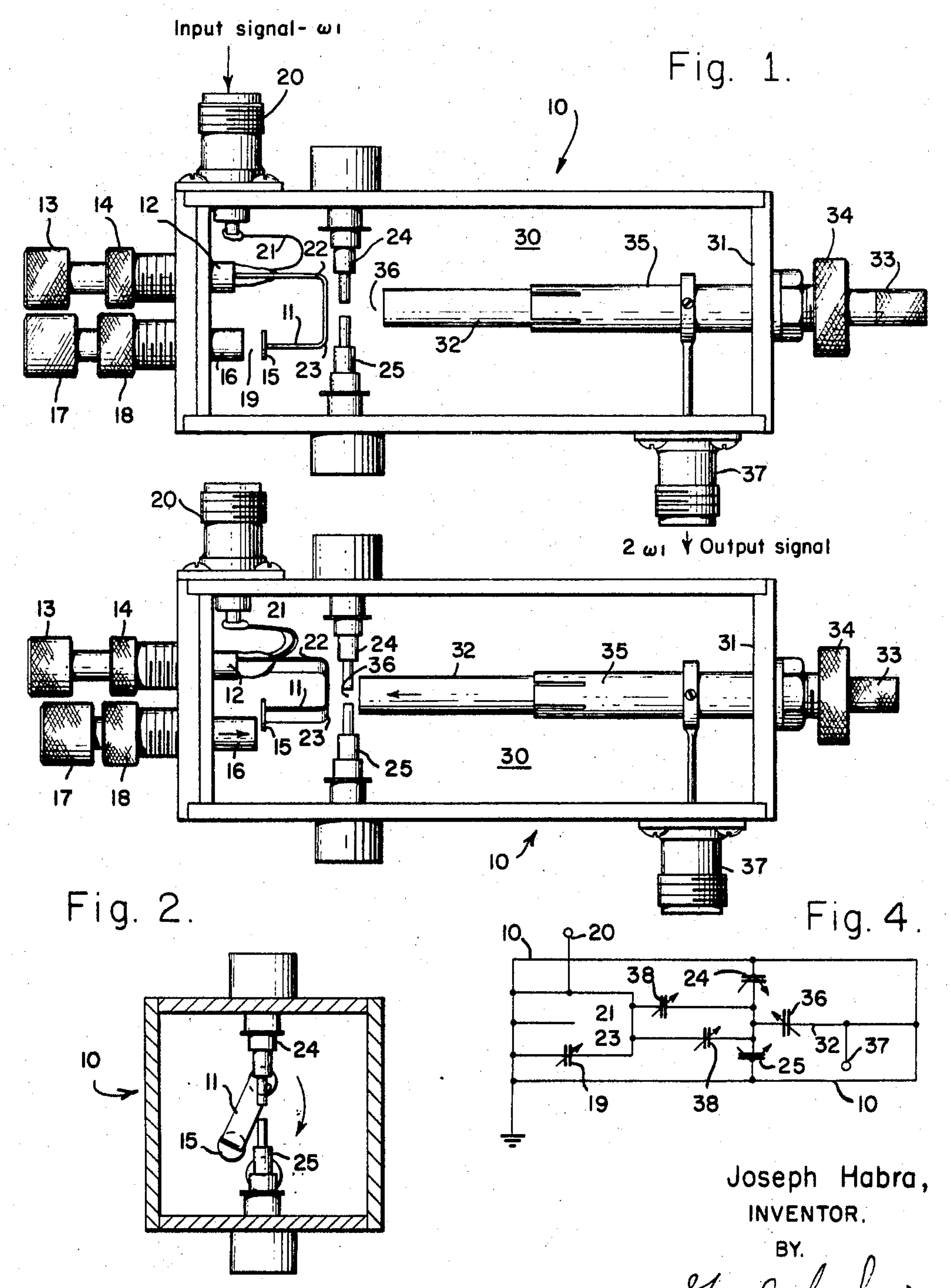

This invention relates to the art of frequency multiplication from a low frequency source to frequencies in the microwave region and more particularly, to a varactor multiplier using two or more varactors for generating high frequencies having higher power and efficiency than previously obtained with common frequency multipliers.

The potential applications for solid-state R-F transmitters in Communication and Radar continue to increase, particularly in connection with Electronic Space Systems. Coincidental with the increasing number of applications are the more stringent requirements of solid-state transmitters (power sources) with regard to increased power generation, increased reliability and increased operating stability.

In this invention, two or more nonlinear voltage variable capacitor commonly called varactors, are used to generate high power at microwave frequencies and with high conversion efficiency.

The advantages of the multiple varactor frequency doubler are, first, lower power dissipation in each varactor diode which permits the frequency doubler to handle n times the power of a single varactor frequency multiplier. Second, for a given power input the varactor dissipation is $1/n$ times the dissipation of a single varactor frequency doubler. The deterioration of the varactor Q is less and the doubler efficiency is higher than for the one varactor type frequency doubler.

The invention is preferably implemented by means of two resonant circuits. The input circuit is tuned to $\omega_1$ and coupled to an output circuit which includes two or more varactors that are excited by an input signal having a frequency of $\omega_1$ equal to the resonant frequency of the defined input circuit. The output frequency of $2\omega_1$ is obtained by coupling the $\omega_1$ signal from the input resonant circuit to the output resonant circuit through the varactors.

A multiple varactor frequency doubler has been constructed in the S and C bands by using two varactors. The output frequency $2\omega_1$ is obtained from an output circuit that resonates at $2\omega_1$. The defined dual varactor frequency doubler is implemented by including the two varactors in the output resonant circuit which is coupled to the desired input frequency of $\omega_1$.

The new doubler is achieved by matching two dissimilar varactors at different impedance points on the input resonator. The coupling or matching of the input resonator to the two varactors is accomplished capacitively. Two currents of the input frequency $\omega_1$ will flow in each of the two varactors. The output currents at $2\omega_1$ are obtained by means of symmetrically locating the two varactors with respect to the inductive output line. The output resonator is tuned to $2\omega_1$.

Further objectives and advantages of the present invention will be made more apparent by referring now to the accompanying drawings wherein:

FIGURE I is a pictorial representation of the actual construction using two varactors in a frequency multiplier according to the teachings of this invention;

FIGURE II is a modification of FIGURE I more fully illustrating the techniques used to accomplish the tuning of the input circuit to the individual varactors and the symmetrical coupling between the varactors and the output circuit;

FIGURE III is an end view of the input circuit illustrated in FIGURE II, more fully illustrating the mechanical tuning of the input circuit to the varactors; and FIGURE IV is a schematic diagram of the mechanical circuits illustrated in FIGURES I and II.

Referring now to FIGURE I, there is shown a preferred embodiment of this invention, using a pair of varactors in a frequency multiplier capable of operating in the S or C band (1,000 mc. to 5,000 gc.). The entire device is contained within a shielded container 10. At one end of the container 10 is an input line 11 connected to a plunger 12 at the low impedance end of the line and which is movable by means of knob 13 that is capable of being locked in a position by lock nut 14. The high impedance end of the input line 11 is terminated at a shoulder 15 which is formed to oppose a plunger 16 capable of being moved in an axial direction by means of knob 17 and that may be locked in position by lock nut 18. The gap between shoulder 15 and plunger 16 defines capacitor 19 that is varied by means of knob 17 in order to tune the input line 11 to the desired input frequency. An input signal $\omega_1$ is fed from a suitable source, not illustrated, through an input terminal 20 to the input line 11 through a flexible connection 21 that is connected to the input line 11 at a point determined by the impedance of the line and the impedance of the input source.

In the preferred embodiment, the input line 11 has a substantially rectangular cross-section and is shaped in the form of a U having bends at points 22 and 23. A plurality of varactors 24 and 25 are mounted to the container 10 and arranged to project along portions of the input line 11 between the bends 22 and 23. Since the varactors 24 and 25 are coupled to different portions of the input line 11, it is not necessary for the varactors to be identical but only that each varactor be properly matched to the input line 11. The techniques employed to match the varactor to the input line are more fully illustrated in connection with FIGURE II.

The output cavity 30 located within the container 10 is defined by the cavity distance between the varactors 24 and 25 and the end 31 of the container 10 that is opposite the input line 11. Tuning of the output cavity 30 is accomplished by means of a plunger 32 capable of being moved in an axial direction by means of a knob 33 and that may be locked in position by a lock nut 34. The output cavity 30 is tuned by moving plunger 32 to close proximity with varactors 24 and 25. According to the feature of this invention, it is necessary that the plurality of varactors be arranged symmetrically with respect to plunger 32. In this embodiment, symmetry is assured by physically locating the varactors 24 and 25 on opposite sides of container 10 and locking plunger 32 in the center line of the container to insure equal coupling to both varactors. For those multipliers using more than two varactors, it would be necessary to symmetrically locate the varactors radially from the center with respect to the output tuning plunger 32. The capacity between the output tuning plunger 32 and the varactors 24 and 25 is the output tuning capacitor 36 used to tune the output capacitor to the output frequency of $2\omega_1$. The output signal of $2\omega_1$ is obtained from a fixed position 35 of the tuning plunger and depending on the impedance conditions, the output signal is fed through an output terminal 37 to a suitable utilizing device not illustrated.

Referring now to FIGURE II, there is shown a drawing similar to that illustrated in FIGURE I but more fully illustrating how the input line 11 is coupled to each of the varactors 24 and 25. As mentioned previously in connection with FIGURE I, rotating the knob 13 will cause the input line 11 to swing in an arc as illustrated in FIGURE III. The significance of this is the fact that different positions of the input line 11 facing the varactors 24 and 25 may be selected in an effort to individually match the impedance of the different positions of the input line to the individual varactors. Coupled with this movement, it is also possible to move knob 13 in an axial direction to thereby vary the coupling between input line 11 and the varactors 24 and 25. Since the input line 11 is capable of being translationally and rotationally moved, it is now apparent why the input signal is connected via a flexible line 21. Tuning of the input line 11 to a frequency of $\omega_1$ is still accomplished by rotating knob 17 which has the effect of moving plunger 16 in an axial direction. The symmetrical coupling between the varactors and the output circuit is assured by the physical location of plunger 32 with respect to the varactors used as mentioned in connection with FIGURE I.

Referring now to FIGURE IV, there is shown a schematic diagram of the dual varactor multiplier illustrated in connection with FIGURES I, II, and III. The defined input resonant circuit consists of the tuned input line 11, which includes capacitor 19 and the two varactors 24 and 25, together with the coupling capacitors 38 existing between individual positions of the input line 11 and varactors 24 and 25 respectively. The input series resonant circuit is excited by the input signal of $\omega_1$. The output frequency of $2\omega_1$ is obtained by means of an output series resonant circuit consisting of the output cavity 30 which includes capacitors 36 and varactors 24 and 25.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claim.

The embodiments of the invention in which an exclusive property or privilege is claimed are defined as follows:

1. A frequency multiplier comprising a folded input resonant line tuned to a resonate frequency of $\omega_1$ by a capacitor at one end, said input line having a substantially rectangular cross-section means for moving said input resonant line; and an output resonant cavity having at least two varactors symmetrically coupled to said input cavity;

each of said varactors coupled to different parts of said rectangular input line.

References Cited

UNITED STATES PATENTS

| | | | |
|---|---|---|---|
| 2,982,922 | 5/1961 | Wilson | 331—76 |
| 3,311,811 | 3/1967 | Rupp | 321—69 |
| 2,408,420 | 10/1946 | Ginzton | 321—60 |
| 3,076,139 | 1/1963 | Holcomb | 321—69 |
| 3,214,684 | 10/1965 | Everitt | 333—83 X |
| 3,227,917 | 1/1966 | Nishida | 333—83 X |
| 3,268,795 | 8/1966 | Hudspeth et al. | 321—69 |
| 3,281,647 | 10/1966 | Hines et al. | 321—69 |
| 3,307,099 | 2/1967 | Weller et al. | 321—69 |

JOHN F. COUCH, *Primary Examiner.*

G. GOLDBEY, *Assistant Examiner.*

U.S. Cl. X.R.

333—82